Patented Aug. 24, 1943

2,327,597

UNITED STATES PATENT OFFICE 2,327,597

PRINTING INK

Donald Robert Erickson and Paul J. Thoma, Kalamazoo, Mich.

No Drawing. Application August 11, 1941, Serial No. 406,401

2 Claims. (Cl. 106—30)

This invention relates to improvements in printing ink.

This invention relates to printing inks and to improved pigments particularly useful therefor. It relates particularly to tannated pigments and to inks using such pigments in connection with a varnish comprising a liquid polyglycol and either a rosin or a terpene hydrocarbon of the formula $C_{10}H_{16}$ such as alpha terpinene modified by an alpha beta unsaturated organic polybasic acid. Such inks have water tolerance and will not set up on the press even when high humidity is encountered. They have the property, however, when printed and treated with water of forming a hard non-offsetting surface which eliminates offset.

The objects of this invention are:

First, to provide a new and improved tannated pigment.

Second, to provide such a pigment which is clear and clean in color and which gives desirable workability to an ink.

Third, to provide a new and improved ink of the class described which is workable and which does not harden rapidly.

Fourth, to provide such an ink with a new and improved body.

Fifth, to provide such an ink which may be used with the aforesaid water treatment after printing to prevent offset.

Further objects and advantages pertaining to details and economies will appear from the description to follow.

In carrying out the invention, we use tannated pigments. Such pigments are treated with tannic acid and tartar emetic. Typical pigments which may be thus tannated are malachite green, methyl violet, auramine, Victoria blue, rhodamine and brilliant blue.

In carrying out the invention, the tannated pigment is resinated with a resin comprising either a rosin or a terpene hydrocarbon of the formula $C_{10}H_{16}$ such as alpha terpinene modified with an alpha beta unsaturated organic polybasic acid such as maleic or fumaric. The modified rosin may be obtained commercially under the trade name "Teglac 127." The modified terpene hydrocarbon may be obtained commercially under the trade name "Petrex Acid."

The resination of the pigment is carried out in the pulp state in substantially the same way as pigments are resinated with rosin. The pigment in the pulp state is thoroughly mixed with the sodium soap of the resin or an alcohol solution of the resin. Up to equal amounts by weight on a dry basis of the resin and the pigment are used. The resin is precipitated after this phase of the treatment and the resinated pigment is dried and ground.

The dried and ground pigment is then incorporated in the usual way in a varnish. We prefer to use a varnish consisting of 50 parts by weight of a liquid polyglycol such as diethylene glycol and 50 parts by weight of either the aforesaid modified rosin or the aforesaid modified terpene hydrocarbon.

A mixture of the aforesaid modified rosin and terpene hydrocarbon may be used either in the ink or in the resination of the pigment.

Tannated pigments other than those specifically listed above may be employed.

The new and improved pigments are clear in color. The ink made employing them is workable for long periods of time. It does not harden up as quickly as would be the case if untreated tannated pigments were employed. It has an improved body. The use of the resinated tannated pigment does not cut down the water tolerance of the ink and the ink is suitable for use in the aforesaid process in which water is employed to prevent offset. The water tolerance is much greater than when a tannated pigment resinated with rosin is employed.

The terms and expressions which have been herein employed are used as terms of description and not of limitation, and there is no intention, in the use of such terms and expressions, of excluding any equivalents of the features shown and described. It is recognized that various modifications are possible within the scope of the invention claimed.

Having thus described our invention, what we claim as new and desire to secure by Letters Patent is:

1. A non-offsetting printing ink having a high water tolerance comprising a varnish comprising a liquid polyglycol as a solvent for the resin, and a resin selected from the group consisting of rosin modified with an alpha beta unsaturated organic polybasic acid and a terpene hydrocarbon of the formula $C_{10}H_{16}$ modified by an alpha beta unsaturated organic polybasic acid and in sufficient amount to form, when subjected to steam immediately after printing, a thin hard film of resin over the exposed surfaces of the printed film, and a pigment comprising a tannated pigment selected from the group consisting of malachite green, methyl violet, auramine, Victoria blue, rhodamine and brilliant blue resinated with a resin selected from the group consisting of rosin modified with an alpha beta unsaturated organic polybasic acid and a terpene hydrocarbon of the formula $C_{10}H_{16}$ modified by an alpha beta unsaturated organic polybasic acid whereby said water tolerance is maintained, printing chracteristics are improved, and spoiling on storage is prevented.

2. A non-offsetting printing ink having a high water tolerance comprising a varnish comprising a liquid polyglycol as a solvent for the resin, and a resin selected from the group consisting of rosin modified with an alpha beta unsaturated organic polybasic acid and a terpene hydrocarbon of the formul $C_{10}H_{16}$ modified by an alpha beta unsaturated organic polybasic acid and in sufficient amount to form, when subjected to steam immediately after printing, a thin hard film of resin over the exposed surfaces of the printed film, and a pigment comprising a tannated pigment selected from the group consisting of malachite green, methyl violet, auramine, Victoria blue, rhodamine and brilliant blue resinated with an equal amount by weight of a resin selected from the group consisting of rosin modified with an alpha beta unsaturated organic polybasic acid and a terpene hydrocarbon of the formula $C_{10}H_{16}$ modified by an alpha beta unsaturated organic polybasic acid whereby said water tolerance is maintained, printing characteristics are improved, and spoilage on storage is prevented.

DONALD ROBERT ERICKSON.
PAUL J. THOMA.